United States Patent
Lin et al.

(10) Patent No.: US 10,391,504 B2
(45) Date of Patent: Aug. 27, 2019

(54) WATER STOP SWITCH DEVICE AND SHOWER HEAD

(71) Applicant: XIAMEN SOLEX HIGH-TECH INDUSTRIES CO., LTD., Xiamen, Fujian (CN)

(72) Inventors: Fengde Lin, Fujian (CN); Hailang Gong, Fujian (CN); Mingfu Zhang, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 90 days.

(21) Appl. No.: 15/379,076

(22) Filed: Dec. 14, 2016

(65) Prior Publication Data
US 2018/0001331 A1 Jan. 4, 2018

(30) Foreign Application Priority Data
Jul. 1, 2016 (CN) ..................... 2016 2 0686901 U

(51) Int. Cl.
| | |
|---|---|
| B05B 1/30 | (2006.01) |
| B05B 1/18 | (2006.01) |
| B05B 12/00 | (2018.01) |
| B05B 1/16 | (2006.01) |
| F16K 31/44 | (2006.01) |
| F16K 25/00 | (2006.01) |
| E03C 1/04 | (2006.01) |
| F16K 39/04 | (2006.01) |

(52) U.S. Cl.
CPC .......... *B05B 1/3013* (2013.01); *B05B 1/1663* (2013.01); *B05B 1/18* (2013.01); *B05B 1/3026* (2013.01); *B05B 12/002* (2013.01); *E03C 1/0409* (2013.01); *F16K 25/00* (2013.01); *F16K 31/44* (2013.01); *F16K 39/04* (2013.01)

(58) Field of Classification Search
CPC ....... B05B 1/3013; B05B 12/002; B05B 1/18; B05B 1/1663; B05B 1/3026; F16K 39/04; F16K 31/44; F16K 25/00; E03C 1/0409
USPC ...... 239/530, 569, 581.1, 581.2, 582.1, 583, 239/596; 251/282
See application file for complete search history.

(56) References Cited

U.S. PATENT DOCUMENTS

| | | | | |
|---|---|---|---|---|
| 5,456,448 A | * | 10/1995 | Chou | ........................ E03C 1/04 251/229 |
| 8,561,632 B2 | * | 10/2013 | Bayer | ..................... C21C 5/462 137/219 |
| 8,573,512 B2 | * | 11/2013 | Hu | ........................ B05B 1/1663 239/443 |

(Continued)

*Primary Examiner* — Alexander M Valvis
*Assistant Examiner* — Qingzhang Zhou
(74) *Attorney, Agent, or Firm* — Rabin & Berdo, P.C.

(57) ABSTRACT

A water stop switch device includes: a main body, a transmission element and a sealing element; the main body is disposed with a water passage, the sealing element is disposed in the water passage; one end of the sealing element is coupled to the transmission element in transmission way, the sealing element moves in the water passage to open the water passage; the other end of the sealing element and the main body surround to form a chamber; the side wall of the sealing element is disposed with a through hole connecting the water passage and the chamber; when the water passage is open, the chamber is full of water to reduce the pressure difference at two ends of the sealing element.

6 Claims, 4 Drawing Sheets

(56) References Cited

U.S. PATENT DOCUMENTS

2008/0302886 A1* 12/2008 Hodel .................. B05B 1/1618
    239/443

* cited by examiner

WATER STOP SWITCH DEVICE AND SHOWER HEAD

FIELD OF THE INVENTION

The present invention relates to an outlet device, particularly to a water stop switch device.

BACKGROUND OF THE INVENTION

A shower head needs to turn off temporally when the user wants to apply shower gel or shampoo. Traditional shower head can only switch to open or close the water by the outlet switch, which is inconvenient. There is a shower head with the main body disposed with a water stop switch button in recent market; when the button is pressed, the shower head can realize temporal water stop. But due to the structure design problem, the button is easily influenced by water pressure during switch, leading to switch force uneven and large. The switch hand feel is bad, the reliability is low.

SUMMARY OF THE INVENTION

The present invention is provided with a water stop switch device, which needs smaller switch force to switch the water stop and water supplying state, the switch hand feel is well.

The technical proposal of the present invention is that:

A water stop switch device, wherein comprising: a main body, a transmission element and a sealing element; the main body is disposed with a water passage, the sealing element is disposed in the water passage; one end of the sealing element is coupled to the transmission element in transmission way, the sealing element moves in the water passage to open the water passage; the other end of the sealing element and the main body surround to form a chamber; the side wall of the sealing element is disposed with a through hole connecting the water passage and the chamber; when the water passage is open, the chamber is full of water to reduce the pressure difference at two ends of the sealing element.

In another preferred embodiment, the main body comprises a spindle and a valve body; the spindle is connected to one end of the valve body in the axial direction of the valve body, an inlet connected to the water passage is formed between the spindle and the valve body.

In another preferred embodiment, the external periphery of the sealing element is disposed with a first sealing ring; when the sealing element moves to the direction closing the water passage, the first sealing ring abuts against the internal wall of the valve body to break the connection of the water passage and the inlet.

In another preferred embodiment, the external periphery of the sealing element is further disposed with a second sealing ring coaxial to the first sealing ring and equal in size to the first sealing ring, the second sealing ring always contacts with the internal wall of a protruding ring of the spindle in sealing way, such to close the clearance between the sealing element and the protruding ring, so that the chamber is connected to the water passage only by the through hole.

In another preferred embodiment, one end of the sealing element is a push rod used to couple to and abut against the transmission element.

In another preferred embodiment, the chamber is further disposed with a reset element; when the sealing element moves until the water passage is open, the reset element is compressed; when the transmission of the transmission element and the sealing element is released, the reset element drives the sealing element to reset.

In another preferred embodiment, the transmission element comprises a pawl column, a pawl shaft and a guiding valve shell coaxially arranged to form a retractable slide shaft driving mechanism; when the end face of the pawl column is pressed, the pawl shaft is switched circularly between a high position and a low position to drive the sealing element to move between an abutting position and a non-abutting position; when the sealing element is in the abutting position, the sealing element moves by the abutting force of the transmission element; when the sealing element is in the non-abutting position, the abutting of the sealing element and the transmission element is released.

The present invention is further provided with a shower head, which comprises a shower head main body, a button and the water stop switch device;

the water stop switch device is assembled in the shower head main body, the button is coupled to the transmission element of the water stop switch device by a swing element.

In another preferred embodiment, the swing element is a pendulum swinging about a support point; two ends of the pendulum respectively abut against the button and the transmission element.

Compared to the traditional technology, the technical solution of the present invention has following advantages:

The present invention is provided with a water stop switch device, which is disposed with a chamber between the sealing element and the main body, the side wall of the sealing element is disposed with a through hole connecting the chamber and the water passage; with these configurations, when the water passage is open, the chamber is full of water, two ends of the sealing element are under water pressures with opposite directions. As the pressed area of the side of the sealing element at the chamber is larger than the other side, the sealing element is reset by the dual action of the resultant force and the reset force of the reset element. The reset speed is fast, the reset effect is reliable.

On the other hand, as the first sealing ring and the second sealing ring are equal in size and coaxially arranged, when the water passage is closed, the first sealing ring is pressed by the water pressure from the water passage, the second sealing ring is pressed by the water pressure from the chamber. Two action forces are equal in power and opposite in directions, they neutralize each other. Therefore, when the sealing element is switched from water stop to water supplying, it basically isn't influenced by water pressure, during this process, air in the chamber exhausts out through the through hole, avoiding switch failure due to increasing air pressure when the chamber is compressed; when the water passage is open, water flows to the chamber through the through hole, only the portion of the chamber corresponding to the push rod of the sealing element is pressed by water flowing, other portion is pushed by two water pressures from opposite directions, the two pressures neutralize, thus the action force of the water flowing on the sealing element is a resultant force, and the section area of the pressed portion is small, equal to the section area of the push rod, so that when the sealing element keeps in water supplying state, the water pressure on the transmission mechanism is small.

DETAILED DESCRIPTION OF THE EMBODIMENT

The present invention will be further described with the drawings and the embodiment.

Figure 1:
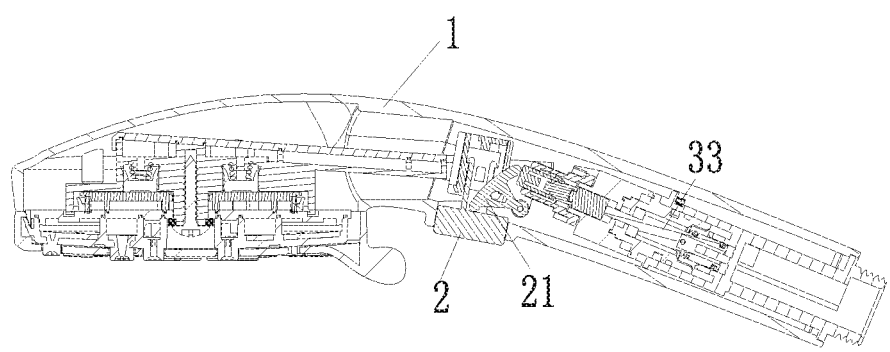
FIG. 1 illustrates a sectional diagram of a shower head of a preferred embodiment of the present invention.

Referring to FIG. 1, a shower head comprises a shower head main body 1, a button 2 and a water stop switch device 3;

The water stop switch device 3 is assembled between an inlet 11 and an outlet 12 of the shower head main body, the button 2 is coupled to the water stop switch device 3 in transmission way by a swing element 21.

In this embodiment, the swing element 21 is a pendulum swinging about a support point; two ends of the pendulum respectively abut against the button 2 and the water stop switch device. Therefore, when the button 2 is pressed, the pendulum swings to form a push force to the water stop switch device 3.

Figure 2:
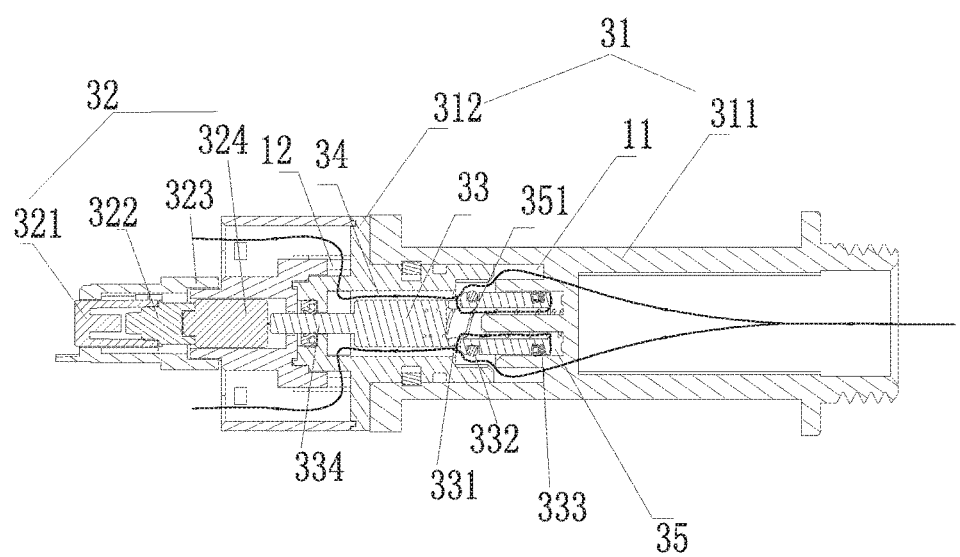
FIG. 2 illustrates a schematic diagram of a water stop switch device in water supplying state of the preferred embodiment of the present invention.
Figure 3:
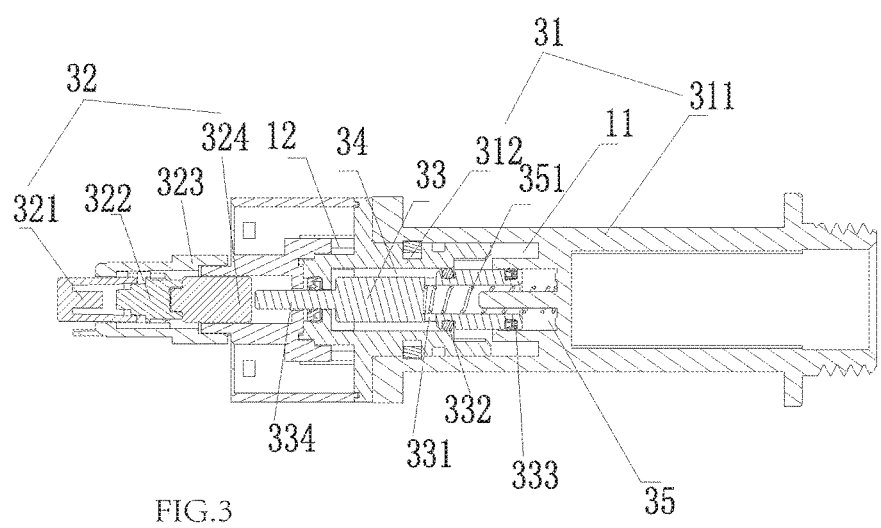
FIG. 3 illustrates a schematic diagram of the water stop switch device in water stop state of the preferred embodiment of the present invention.
Figure 4:
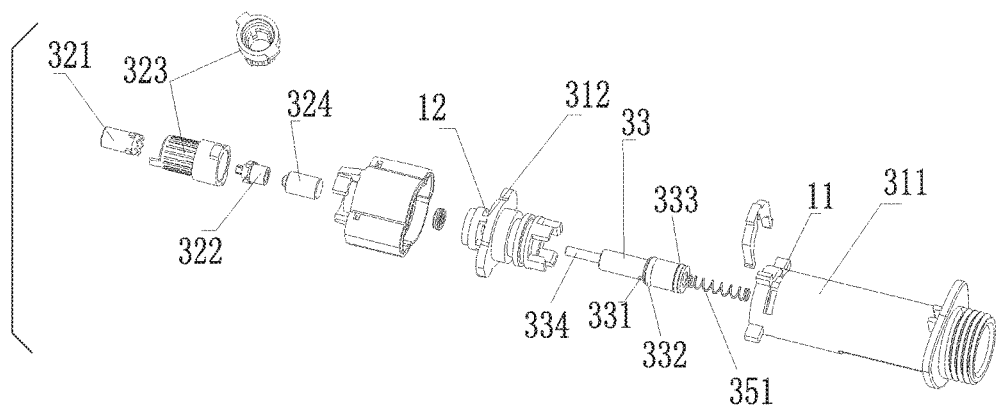
FIG. 4 illustrates an exploded and schematic diagram of the water stop switch device of the preferred embodiment of the present invention.

Further referring to FIGS. 2-4, the water stop switch device 3 comprises a main body 31, a transmission element 32 and a sealing element 33;

The main body 31 comprises a spindle 311 and a valve body 312, further comprising a water passage 34; the sealing element 33 is disposed in the water passage 34; one end of the sealing element 33 is coupled to the transmission element 32 in transmission way, the sealing element 33 moves in the water passage 34 to open the water passage 34; the other end of the sealing element 33 and the main body 31 surround to form a chamber 35; the side wall of the sealing element 33 is disposed with a through hole 331 connecting the water passage 34 and the chamber 35; when the water passage 34 is open, the chamber 35 is full of water, such that two ends of the sealing element 33 are under water pressure from opposite directions.

As the pressed area of the side of the sealing element at the chamber 35 is larger than the other side, when the transmission force of the transmission element 32 and the sealing element 33 is released, due to the water pressure difference, the sealing element 33 is reset under the action of the water pressure difference to reclose the water passage 34.

The external periphery of the sealing element 33 is disposed with a first sealing ring 332; when the sealing element 33 moves to the direction closing the water passage, the first sealing ring 332 abuts against the internal wall of the valve body 312 to break the connection of the water passage 34 and the inlet 11.

The external periphery of the sealing element 33 is further disposed with a second sealing ring 333 coaxial to the first sealing ring 332 and equal in size to the first sealing ring 332, the second sealing ring 333 always contacts with the internal wall of a protruding ring of the spindle 311 in sealing way, such to close the clearance between the sealing element 33 and the protruding ring, so that the chamber 35 is connected to the water passage 34 only by the through hole 331.

The sealing element 33 is further disposed with a push rod 334 used to couple to and abut against the transmission element 32.

With these configurations, when the water passage 34 is closed, the first sealing ring 332 and the second sealing ring 333 are pressed by water flowing from the inlet 11; as the first sealing ring 332 and the second sealing ring 333 are equal in size and are coaxial, the water pressed areas are the same, which can be considered that two action forces are equal in power and opposite in directions, they neutralize each other. Therefore, when the sealing element 33 is switched from water stop to water supplying, it basically isn't influenced by water pressure, during this process, air in the chamber 35 exhausts out through the through hole 331, avoiding switch failure due to increasing air pressure when the chamber 35 is compressed; when the water passage 34 is open, water flows to the chamber 35 through the through hole 331, only the portion of the chamber 35 corresponding to the push rod 334 of the sealing element 33 is pressed by water flowing, other portion is pushed by two water pressures from opposite directions, the two pressures neutralize, thus the action force of the water flowing on the sealing element 33 is a resultant force, and the section area of the pressed portion is small, equal to the section area of the push rod 334, so that when the sealing element keeps in water supplying state, the water pressure on the transmission mechanism is small.

The chamber 35 is disposed with a reset element 351, when the sealing element 33 moves until the water passage 34 is open, the reset element 351 is compressed; when the transmission of the transmission element 32 and the sealing element 33 is released, the reset element 351 drives the sealing element 33 to reset. Therefore, the sealing element 33 is reset by the dual action of the said resultant force and the reset force of the reset element 351. The reset speed is fast, the reset effect is reliable.

The transmitting element 32 comprises a pawl column 321, a pawl shaft 322 and a guiding valve shell 323 coaxially arranged to form a retractable slide shaft driving mechanism, further comprising an abutting block 324 coupled to the pawl shaft 322 and connected to the push rod 334 in transmission way; as needed, the abutting block 324 and the pawl shaft 322 can be integrally disposed, such to directly transmit the motion of the pawl shaft 322 to the push rod 334; in this embodiment, when the end face of the pawl column 321 is pressed, the pawl shaft 322 is switched circularly between a high position and a low position to drive the abutting block 324 to move between an abutting position and a non-abutting position and the sealing element to move between an abutting position and a non-abutting position; when the abutting block 324 moves from the high position to the low position, the sealing element 33 moves by the abutting force of the abutting block 324; when the abutting block 324 moves form the low position to the high position, the abutting of the sealing element 33 and the abutting block 323 is released.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A water stop switch device, comprising: a main body, a retractable slide shaft driving mechanism and a sealing element; wherein: the main body includes a water passage;

the sealing element is disposed in the water passage; one end of the sealing element is coupled to the retractable slide shaft driving mechanism; the sealing element moves in the water passage to open the water passage; another end of the sealing element and the main body form a chamber; a side wall of the sealing element includes a through hole connecting the water passage and the chamber; an external periphery of the sealing element includes a first sealing ring and a second sealing ring; the through hole is downstream of the first sealing ring and the second sealing ring in a water flow direction; and when the water passage is open, the chamber is full of water to reduce the pressure difference at the one end and the other end of the sealing element; the second sealing ring is coaxial with the first sealing ring and equal in size to the first sealing ring; and the second sealing ring always contacts an internal wall of a protruding ring of a spindle in a sealing way, to close a clearance between the sealing element and the protruding ring, so that the chamber is connected to the water passage only by the through hole, the main body further includes the spindle and a valve body; the spindle is connected to one end of the valve body in an axial direction of the valve body; and a connection of an inlet to the water passage is formed between the spindle and the valve body; and when the sealing element moves in a direction closing the water passage, the first sealing ring abuts against an internal wall of the valve body to break the connection of the water passage and the inlet.

2. The water stop switch device according to claim 1, wherein the one end of the sealing element is a push rod to couple to and abut against the retractable slide shaft driving mechanism.

3. The water stop switch device according to claim 1, wherein:
the chamber includes a spring;
when the sealing element moves until the water passage is open, the spring is compressed; and
when transmission of the retractable slide shaft driving mechanism and the sealing element is released, the spring drives the sealing element to reset.

4. The water stop switch device according to claim 1, wherein:
the retractable slide shaft driving mechanism comprises a pawl column, a pawl shaft and a guiding valve shell coaxially arranged;
when an end face of the pawl column is pressed, the pawl shaft is switched circularly between a high position and a low position to drive the sealing element to move between an abutting position and a non-abutting position;
when the sealing element is in the abutting position, the sealing element moves by an abutting force of the retractable slide shaft driving mechanism; and
when the sealing element is in the non-abutting position, abutting of the sealing element and the retractable slide shaft driving mechanism is released.

5. A shower head, comprising a shower head main body, a button and the water stop switch device according to claim 1; wherein:
the water stop switch device is assembled in the shower head main body; and
the button is coupled to the retractable slide shaft driving mechanism of the water stop switch device by a pendulum.

6. The shower head according to claim 5, wherein:
the pendulum swings about a support point; and
two ends of the pendulum respectively abut against the button and the retractable slide shaft driving mechanism.

* * * * *